(12) United States Patent
Sand

(10) Patent No.: US 6,322,001 B1
(45) Date of Patent: *Nov. 27, 2001

(54) EJECTOR DEVICE

(75) Inventor: Kjell Sand, Västra Frölunda (SE)

(73) Assignee: Aplicator System AB, Molnlycke (SE)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/793,682
(22) PCT Filed: Jul. 31, 1995
(86) PCT No.: PCT/SE95/00893
 § 371 Date: Feb. 28, 1997
 § 102(e) Date: Feb. 28, 1997
(87) PCT Pub. No.: WO96/06687
 PCT Pub. Date: Mar. 7, 1996

(30) Foreign Application Priority Data

Aug. 29, 1994 (SE) .................................. 9402874

(51) Int. Cl.$^7$ .................................................. B05B 1/00
(52) U.S. Cl. .................... 239/124; 239/500; 239/520; 239/589
(58) Field of Search .................. 239/288.5, 428.5, 239/423, 424, 124, 500, 520, 589; 118/308

(56) References Cited

U.S. PATENT DOCUMENTS

| 2,086,183 | * | 7/1937 | Gellner et al. | 239/288.5 |
| 2,761,516 | * | 9/1956 | Vassilkovsky | 239/428.5 |
| 3,724,762 | * | 4/1973 | Freshour et al. | 239/428.5 |
| 3,943,329 | * | 3/1976 | Hlavac | 239/424 |
| 3,946,947 | * | 3/1976 | Schneider | 239/428.5 |
| 4,178,134 | * | 12/1979 | Babish et al. | 239/428.5 |

FOREIGN PATENT DOCUMENTS

| 1257352 | 2/1961 | (FR) . |
| 9513992 | 5/1995 | (WO) . |

* cited by examiner

Primary Examiner—Richard Crispino
(74) Attorney, Agent, or Firm—Ostrolenk, Faber, Gerb & Soffen, LLP

(57) ABSTRACT

An ejection nozzle for transport of fiber thread pieces by means of compressed air, e.g. reinforcement material for manufacturing fibre reinforced plastic products, from a cutter to a moulding cavity. The nozzle is provided with a common flow duct for the compressed air and the fibre thread pieces. The flow duct runs past at least one reflector surface (15) for the air flow, and at least one opening (16) for evacuation of air to the surroundings is located along the flow duct.

8 Claims, 1 Drawing Sheet

EJECTOR DEVICE

TECHNICAL FIELD

The present invention refers to an ejection nozzle for transport of fiber thread pieces by means of compressed air e.g. reinforcement material for manufacturing fiber reinforced plastic products, from a cutter to a molding cavity, which nozzle is provided with a common flow duct for the compressed air and the fiber thread pieces.

BACKGROUND OF THE INVENTION

In robot-controlled production of fiber reinforced plastic products, fiber thread pieces are fed out into a molding cavity while being oriented, so that the strength of the fibers is utilized efficiently in the finished product. Compressed air is used for the transport of the cut fiber pieces from the cutter to the molding cavity.

If the pressure/speed of the compressed air is not sufficiently high at the center, static electricity will make fiber pieces stick to the vicinity of the cutter, so that the feeding out is stopped up. This may be economically seriously damaging if the operations at a production line, which depends upon the plastic details, is also influenced by the production loss.

However, if air pressure/speed is too high at the molding cavity, fiber pieces may be oriented wrongly in the cavity, simply by being blown away from their intended location, or because they are deflected from the mold surface by having too high kinetic a energy.

These problems can be reduced if it is possible to maintain an optimal distance between the feed out apparatus and the molding cavity. However, this is hardly ever possible, e.g. because of lack of space.

THE TECHNICAL PROBLEM

One object of the present invention is therefore to provide an apparatus for feeding out fiber thread pieces from a cutter, which makes it possible to maintain a high air pressure velocity at the cutter and at the same time avoid that the fibers end up wrong in the molding cavity, or outside the same.

THE SOLUTION

For this purpose, the apparatus according to the invention is characterized in that the flow duct runs past at least one reflector surface for the air flow, and that at least one opening for evacuation of air that has moved upstream past the reflector surface to the surroundings is located along the flow duct.

DESCRIPTION OF THE DRAWINGS

The invention will be described here below with reference to an embodiment shown in the accompanying drawings, in which.

DESCRIPTION OF EMBODIMENTS

Figure 3:
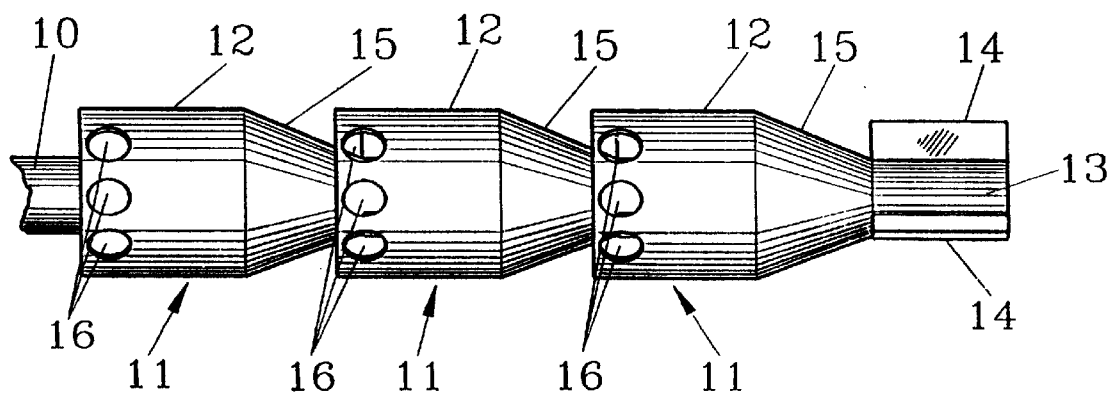
FIG. 3 shows a series of units according to FIGS. 1 and 2 joined together into an ejector nozzle.

The ejector nozzle shown in FIG. 3 is used mounted upon a not shown robot arm, for feeding out fiber thread pieces from a likewise not shown cutter to a molding cavity. The robot arm is preferably freely movable in space and is controlled by a programmable micro processor.

The ejector nozzle in FIG. 3 is both carried by and is supplied with compressed air and fiber thread pieces via an ejector tube 10. The nozzle comprises in the shown embodiment a series of three damper units 11.

Together, the ejector tube 10 and the damper unit 11 form a flow duct with varying diameter for the compressed air and the fiber thread pieces. Thus, the ejector tube 10 forms first section of the flow duct, which protrudes into and carries a first damper unit 11. This damper unit in turn protrudes into and carries a second damper unit, which in its turn carries a third damper unit 11.

Figure 1:
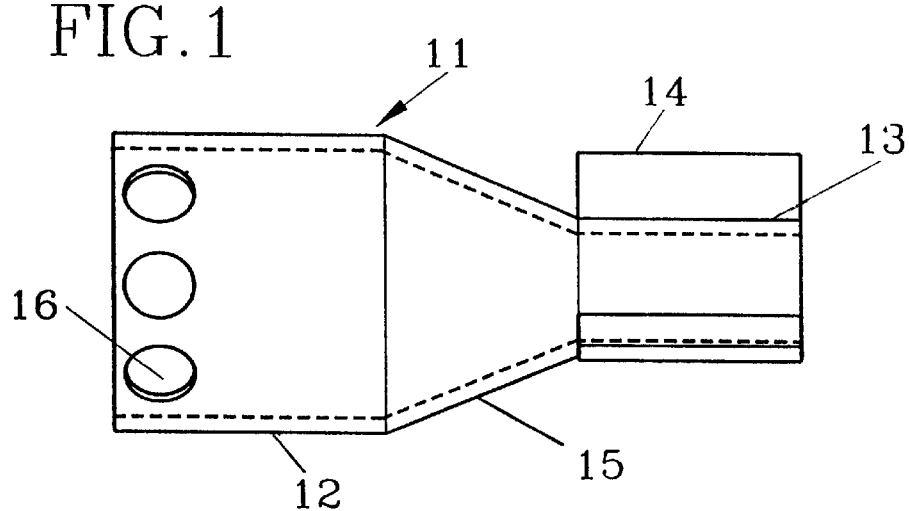
FIG. 1 is a side view of a damper unit according to the invention.
Figure 2:
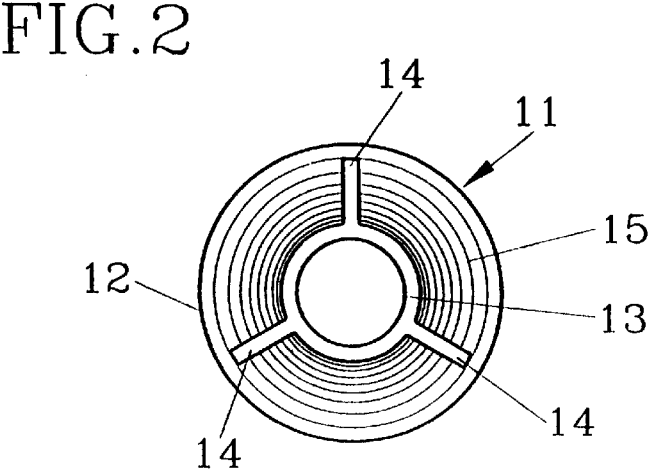
FIG. 2 is an end view of the damper unit in FIG. 1.

As shown in FIGS. 1 and 2, each damper unit 11 is formed as a composite duct which comprises a first cylindrical tube or duct 12 and a second tube or duct 13 with a cross section which is reduced in relation to the first tube 12. The second tube 13 forms a bracket means such as a support bracket with three radially protruding wings 14.

The second tube part 13 with the bracket means 14 is entirely protruding into the cylindrical tube part 12 on the next following damper unit 11, in such a way that the wings 14 are centering the units along a common longitudinal axis.

In each damper unit, the first cylindrical tube 12 and the second tube 13 with the bracket means 14 are interconnected via transition duct or body 15 which tapers conically in the direction of flow. In its position of use, the body 15 which tapers in the direction of air flow forms a reflection surface for the air flow, so that it is slowed down. Thus, the body 15 creates a local increase in pressure in front of the mouth of the second tube 13, which forces air to flow back along the outside of the ejector 10 and the outside of the previous damper unit tube 13, respectively, between the three wings 14 and evacuates to the surrounding atmosphere. For this purpose, there are also holes 16 drilled in the first cylindrical tube 12.

While the air stream in this way is slowed down step by step via the damper units 11, the fiber thread pieces which have initially been accelerated by the air stream substantially maintain their kinetic energy during the passage through the ejector nozzle. This implies that the range is maintained for the fiber pieces, and that the air flow at the end of the ejector nozzle is so reduced, that it is not able to disturb the already transported fibers in the molding.

It is simple to adapt the ejection nozzle according to the invention to different modes of application by selecting a suitable number of damper units.

The invention is not limited to the above described embodiment, but several variants are possible within the scope of the accompanying claims. For example, the tubes 12, 13 of the damper units do not have to be cylindrical. The shape of the reflector surface 15 can also vary within wide limits. The holes 16 are not necessary for the invention, because air can leave between the end edge of the tube 12 and the outside of the reflector wall 15 of the previous damper unit. Also the diameter of the tubes 13 may vary between the damper units 11 along the flow duct, so that the last tube 13 in the direction of flow has a reduced diameter.

What is claimed is:

1. An ejection nozzle for transport of fiber thread pieces by compressed air, the ejection nozzle comprising:

a flow duct comprised of a series of damper units, each damper unit including a first tube on the inlet side of the damper unit and having a larger cross section, a second tube on the outside of the damper unit and having a smaller cross section, and a damper unit body between the first and second tubes, the body having a tapering cross section in the flow duct such that each damper unit has a greater cross section for air flow from the inlet side upstream and a smaller cross section for air flow from the outlet side and toward downstream;

the damper units being arranged in series with the second tube of each unit extending into the first tube of the adjacent unit downstream, the second tubes being so supported and positioned on the respective ones of the first tubes as to permit airflow to exit the duct as the junction between one of the second tubes and the respective one of the first tubes into which the second tube extends, and to permit the air to flow upstream out of the duct past the then upstream damper unit.

2. The ejection nozzle of claim 1, wherein the reflector surface of the damper unit is conically tapered.

3. The ejection nozzle of claim 1, wherein each second tube is held adjacent the first tube for defining a space around the second tube past which the air flow may exit from the flow duct and then the air flow passes the respective reflector surface of the damper unit upstream of the space between the second tube in the first tube.

4. The ejection nozzle of claim 3, further comprising a support bracket on each of the second tubes of each damper unit for supporting the respective second tube in the first tube of the adjacent damper unit that is downstream for providing space between the second tube and the first tube into which the second tube extends past which air can flow upstream over the reflector surface.

5. An ejection nozzle for transporting fiber thread pieces by means of compressed air comprising a plurality of composite ducts arranged in series coaxially, each composite duct comprising:

a first cylindrical duct, having an inlet end and an outlet end and a first diameter, a second cylindrical duct, having an inlet end and an outlet end and a second diameter smaller than the first diameter, and a conical transition duct connecting the outlet end of said first cylindrical duct with the inlet end of said second cylindrical duct, wherein, for each of the serially arranged composite ducts except for the composite duct at the end of the series, the outlet end of said second cylindrical duct extends into the inlet end of said first cylindrical duct of the composite duct immediately downstream thereof;

wherein the last said second cylindrical duct in the direction of flow is of smaller diameter than said second cylindrical duct immediately upstream thereof; and wherein the ejection nozzle is provided with at least one opening for evacuating air.

6. The ejection nozzle of claim 5, further comprising a support bracket on each of said second cylindrical ducts for supporting the respective second cylindrical duct in said first cylindrical duct that is downstream for providing space between the second tube and the first tube into which the second cylindrical duct extends.

7. The ejection nozzle of claim 6, wherein the bracket on each second tube comprises a plurality of wings projecting radially from the second tube.

8. An ejection nozzle for transporting fiber thread pieces by means of compressed air comprising a plurality of composite ducts arranged in series coaxially, each composite duct comprising:

a first cylindrical duct, having an inlet end and an outlet end and a first diameter, a second cylindrical duct, having an inlet end and an outlet end and a second diameter smaller than the first diameter, and a conical transition duct connecting the outlet end of said first cylindrical duct with the inlet end of said second cylindrical duct;

wherein, for each of the serially arranged composite ducts except for the composite duct at the end of the series, the outlet end of each said second cylindrical duct extends into the inlet end of said first cylindrical duct of the composite duct immediately downstream thereof;

wherein the ejection nozzle is provided with at least one opening for evacuating air; and wherein the diameter of said second cylindrical ducts varies between said composite ducts so that the last said second cylindrical duct in the direction of flow has a reduced diameter.

* * * * *